(12) United States Patent
Nonogawa et al.

(10) Patent No.: US 11,073,206 B2
(45) Date of Patent: Jul. 27, 2021

(54) SHIFT DEVICE

(71) Applicant: KABUSHIKI KAISHA TOKAI-RIKA-DENKI-SEISAKUSHO, Aichi-ken (JP)

(72) Inventors: Daichi Nonogawa, Aichi-ken (JP); Hirofumi Ide, Aichi-ken (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 0 days.

(21) Appl. No.: 16/821,146

(22) Filed: Mar. 17, 2020

(65) Prior Publication Data
US 2020/0300356 A1    Sep. 24, 2020

(30) Foreign Application Priority Data
Mar. 20, 2019    (JP) .............................. JP2019-053349

(51) Int. Cl.
*F16H 59/10* (2006.01)
*F16H 59/02* (2006.01)

(52) U.S. Cl.
CPC ......... *F16H 59/0278* (2013.01); *F16H 59/10* (2013.01); *F16H 2059/026* (2013.01); *F16H 2059/0282* (2013.01)

(58) Field of Classification Search
CPC ................. F16H 59/0278; F16H 59/10; F16H 2059/026; F16H 2059/0282
See application file for complete search history.

(56) References Cited

U.S. PATENT DOCUMENTS

| | | | | |
|---|---|---|---|---|
| 5,179,870 A | * | 1/1993 | Behrens ................. | B60K 20/02 74/473.23 |
| 6,058,797 A | * | 5/2000 | Konig ...................... | G05G 1/06 16/436 |
| 6,421,881 B1 | * | 7/2002 | Shovlin ................... | F16H 59/02 16/441 |
| 7,272,988 B2 | * | 9/2007 | Meyer ................. | F16H 59/0278 74/473.3 |

(Continued)

FOREIGN PATENT DOCUMENTS

JP    2017-87956 A    5/2017

*Primary Examiner* — David M Fenstermacher
(74) *Attorney, Agent, or Firm* — Roberts Calderon Safran & Cole, P.C.

(57) ABSTRACT

A shift device includes a shift main body, an operation body, a resilient engaging member and a restricting portion. The shift main body structures a shift body, which is moved to change a shift position. A first engaging portion is provided at the shift main body. The operation body structures the shift body, and is operated to move the shift body. A second engaging portion is provided at the operation body. The engaging member engages with the first engaging portion and the second engaging portion and restricts detachment of the operation body from the shift main body. When the engaging member is pushed, the engaging member deforms and releases the engagement with the first engaging portion or the second engaging portion. The restricting portion restricts pushing of the engaging member after the engagement of the engaging member with the first engaging portion or second engaging portion has been released.

4 Claims, 4 Drawing Sheets

(56) References Cited

U.S. PATENT DOCUMENTS

| | | | | |
|---|---|---|---|---|
| 7,546,783 | B2* | 6/2009 | Tucker | F16H 59/0278 |
| | | | | 74/543 |
| 8,256,324 | B2* | 9/2012 | Laming | F16H 59/0278 |
| | | | | 74/523 |
| 8,424,409 | B2* | 4/2013 | Kops | F16H 59/0278 |
| | | | | 74/473.1 |
| 8,726,756 | B2* | 5/2014 | Moreno Colom | F16H 59/044 |
| | | | | 74/473.33 |
| 10,100,919 | B1* | 10/2018 | Turney | F16H 59/0278 |
| 10,732,663 | B2* | 8/2020 | Lenfert | G05G 1/06 |
| 2006/0005660 | A1* | 1/2006 | Rick | F16H 59/12 |
| | | | | 74/523 |

* cited by examiner

SHIFT DEVICE

CROSS-REFERENCE TO RELATED APPLICATION

This application is based on and claims priority under 35 USC 119 from Japanese Patent Application No. 2019-053349 filed on Mar. 20, 2019, the disclosure of which is incorporated by reference herein.

BACKGROUND

Technical Field

The present disclosure relates to a shift device in which a shift body is moved and a shift position is changed.

Related Art

In a shift lever structure recited in Japanese Patent Application Laid-Open (JP-A) No. 2017-87956, a fixing member is inserted into an anchoring groove of a shift shaft and a first support portion of a shift knob main body, restricting detachment of the shift knob main body from the shift shaft. The fixing member can be deformed and removed from the anchoring groove by the fixing member being pushed.

In this shift lever structure, it is preferable if excessive deformation of the fixing member can be inhibited.

SUMMARY

In consideration of the circumstances described above, an object of the present disclosure is to provide a shift device that may inhibit excessive deformation of an engaging member.

A shift device according to a first aspect of the present disclosure includes: a shift main body that structures a shift body, the shift body being moved and a shift position thereof being changed, and a first engaging portion being provided at the shift main body; an operation body that structures the shift body, the operation body being operated and moving the shift body, and a second engaging portion being provided at the operation body; an engaging member with resilience, the engaging member engaging with the first engaging portion and the second engaging portion and restricting detachment of the operation body from the shift main body, and, when the engaging member is pushed, the engaging member deforming and releasing the engagement with at least one of the first engaging portion or second engaging portion; and a restricting portion that, after the engagement of the engaging member with the at least one of the first engaging portion or second engaging portion has been released, restricts pushing of the engaging member.

In a shift device according to a second aspect of the present disclosure, in the shift device according to the first aspect of the present disclosure, the restricting portion separates a pushing object that pushes the engaging member from the engaging member.

In a shift device according to a third aspect of the present disclosure, in the shift device according to the second aspect of the present disclosure, when the engaging member is pushed, the engaging member moves into the restricting portion.

In a shift device according to a fourth aspect of the present disclosure, in the shift device according to any one of the first to third aspects of the present disclosure, the restricting portion restricts movement of a pushing object that pushes the engaging member.

In the shift device according to the first aspect of the present disclosure, the shift body is operated to change the shift position. The shift main body and the operation body constitute the shift body, and the engaging member features resilience. The engaging member engages with the first engaging portion and the second engaging portion, restricting detachment of the operation body from the shift main body. When the engaging member is pushed, the engaging member is deformed and the engagement of the engaging member with the first engaging portion or the second engaging portion is released.

After the engagement of the engaging member with the first engaging portion or the second engaging portion is released, the restricting portion restricts pushing of the engaging portion. Thus, excessive deformation of the engaging member may be inhibited.

In the shift device according to the second aspect of the present disclosure, the restricting portion separates the pushing object pushing the engaging member from the engaging member. Thus, the restricting portion may restrict pushing of the engaging member.

In the shift device according to the third aspect of the present disclosure, the engaging member is pushed and moves into the restricting portion. Thus, the restricting portion may separate the pushing object from the engaging member.

In the shift device according to the fourth aspect of the present disclosure, the restricting portion restricts movement of the pushing object that pushes the engaging member. Thus, the restricting portion may restrict pushing of the engaging member.

BRIEF DESCRIPTION OF THE DRAWINGS

Exemplary embodiments of the present disclosure will be described in detail based on the following figures, wherein:

FIG. 2A and FIG. 2B are perspective views, seen diagonally from rear-leftward, showing the shift device according to the first exemplary embodiment of the present disclosure, of which FIG. 2A shows the principal portions and FIG. 2B shows a region of mounting of a knob to a shaft;

FIG. 3A and FIG. 3B are sectional views seen from upward (sectional views cut along line 3A-3A in FIG. 1), showing the shift device according to the first exemplary embodiment of the present disclosure, of which FIG. 3A shows the principal portions and FIG. 3B shows a situation when a clip is being pushed; and FIG. 4A and FIG. 4B are sectional views seen from upward (sectional views cut along line 3A-3A in FIG. 1), showing a shift device according to a second exemplary embodiment of the present disclosure, of which FIG. 4A shows principal portions and FIG. 4B shows a situation when a clip is being pushed.

DETAILED DESCRIPTION

First Exemplary Embodiment

Figure 1:
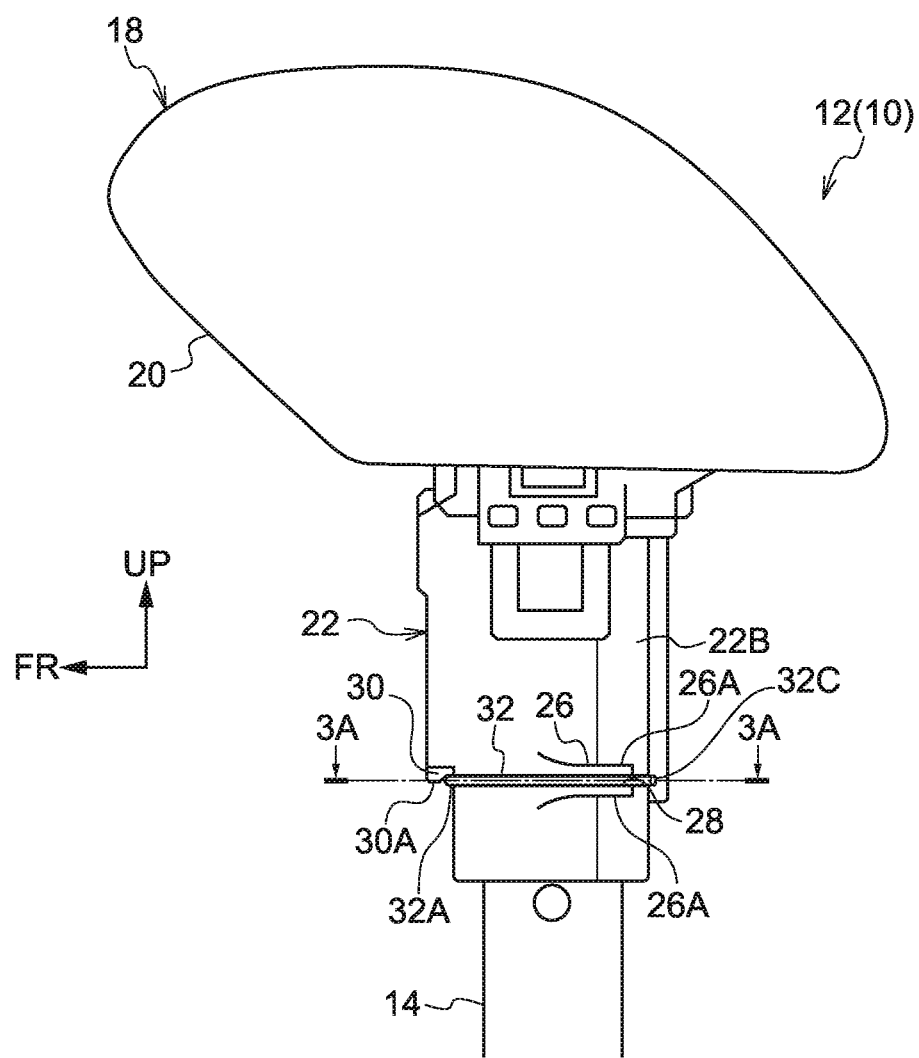
FIG. 1 is a side view, seen from leftward, showing principal portions of a shift device according to a first exemplary embodiment of the present disclosure.
Figure 2A:
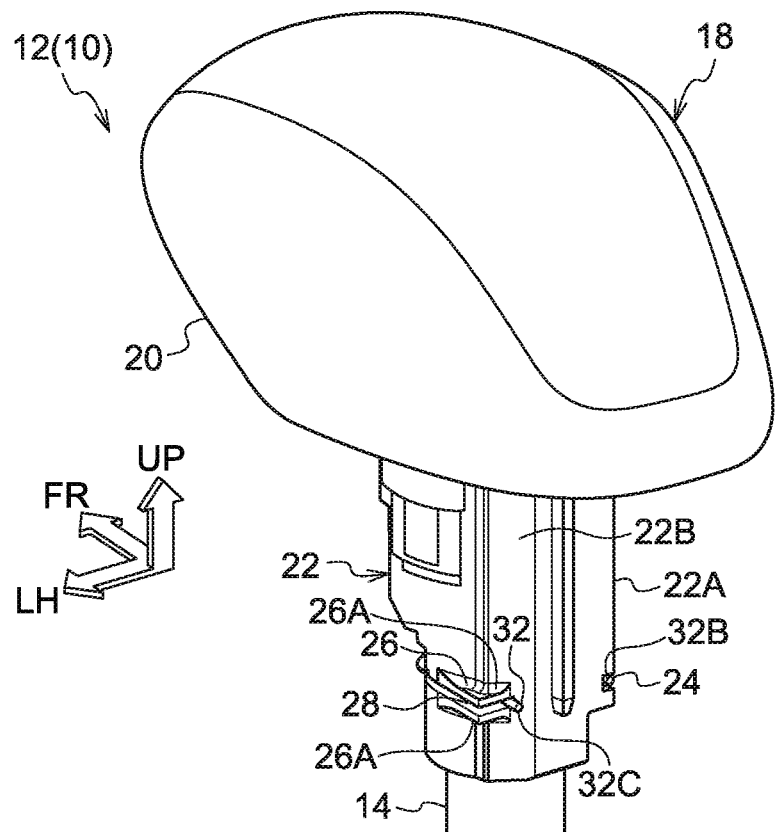

FIG. 1 shows principal portions of a shift device 10 according to a first exemplary embodiment of the present disclosure in a side view seen from leftward. FIG. 2A shows the principal portions of the shift device 10 in a perspective view seen diagonally from rear-leftward. In the drawings, the front direction of the shift device 10 is indicated by arrow FR, the left direction of the shift device 10 is indicated by arrow LH, and the upper direction of the shift device 10 is indicated by arrow UP.

As shown in FIG. 1 and FIG. 2A, the shift device 10 according to the present exemplary embodiment is provided with a substantially rod-shaped lever 12 that serves as a moving body. A lower side portion (a base side end portion) of the lever 12 is supported at an operation body (not shown in the drawings) at the vehicle body side to be turnable (movable) in the front-and-rear direction. The lever 12 is disposed to be parallel with a vertical direction. A shift position of the lever 12 is changed by the lever 12 being turned in the front-and-rear direction.

A shaft 14 in a substantially circular tube shape is provided to be coaxial with the lever 12. The shaft 14 serves as a shift main body. An insertion slot 16 (see FIG. 3A) with a rectangular shape in cross section is formed in a left end portion of an upper portion (distal end side portion) of the shaft 14. The insertion slot 16 serves as a first engaging portion. The insertion slot 16 extends in the front-and-rear direction and opens out to the front side, the rear side and the left side.

A knob 18 that serves as an operation body is mounted to an upper portion of the shaft 14.

A knob main body 20 substantially in a parallelepiped shape is provided at an upper side portion of the knob 18. The knob main body 20 serves as an operation body. In a state in which the knob main body 20 is gripped by an occupant of the vehicle (in particular, a driver), the knob 18 is operated in the front-and-rear direction and the lever 12 is turned in the front-and-rear direction.

Figure 2B:
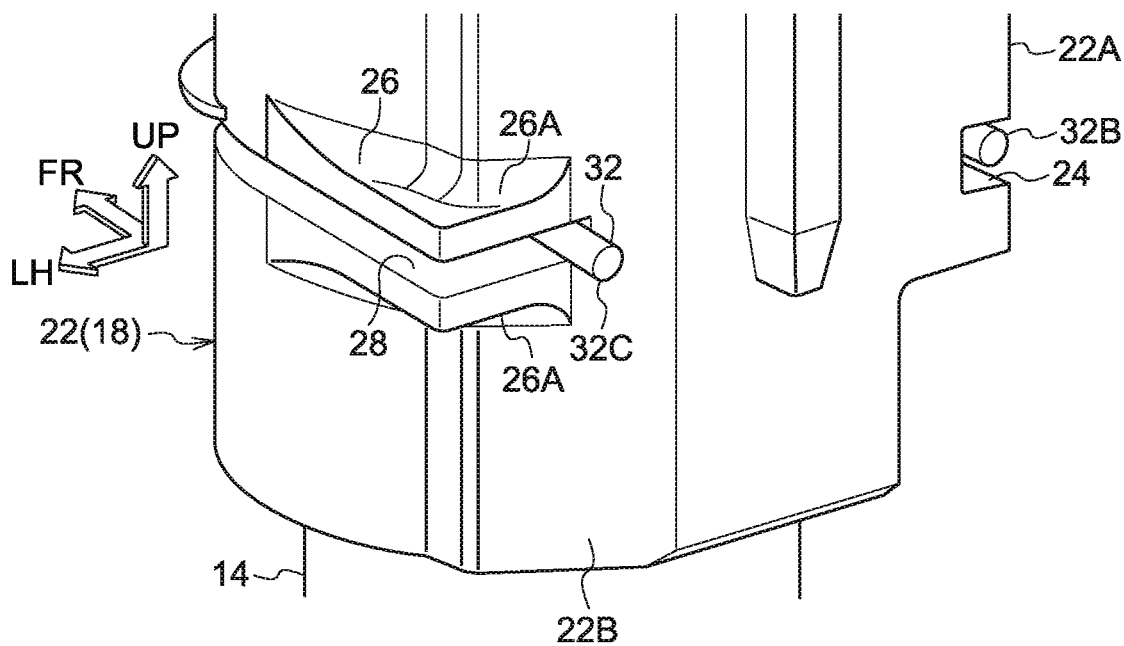
Figure 3A:
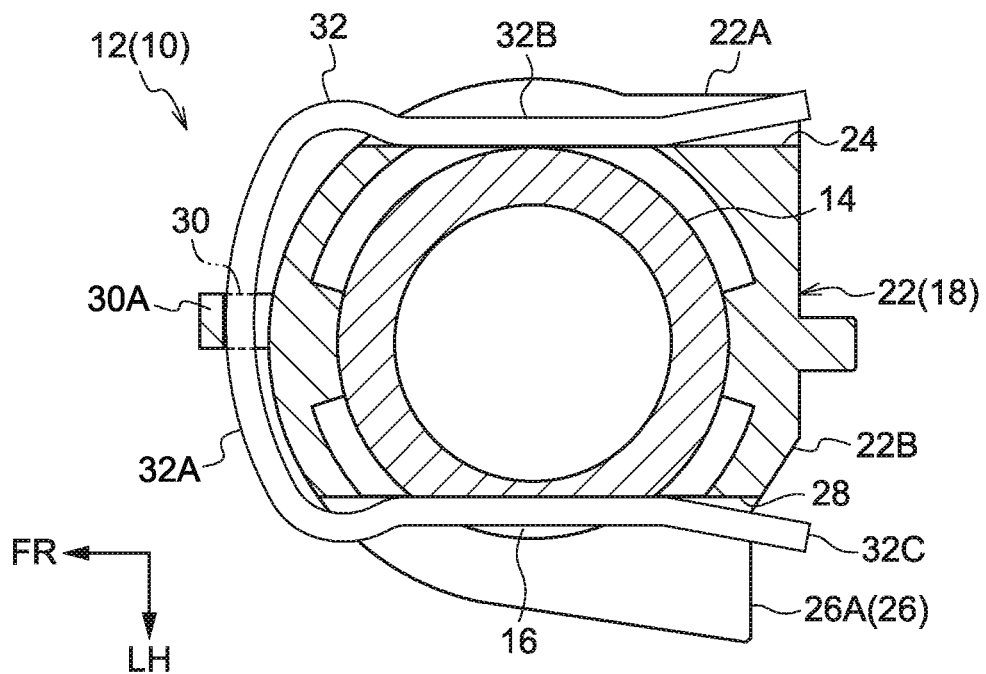

As is shown in detail in FIG. 2B and FIG. 3A, a mounting tube 22 in a substantially circular tube shape is integrally provided at the lower side of the knob main body 20. The mounting tube 22 serves as a mounting portion. The shaft 14 is coaxially fitted inside the mounting tube 22 from the lower side of the mounting tube 22. Rotation of the mounting tube 22 relative to the shaft 14 is limited, and thus rotation of the knob 18 relative to the shaft 14 is limited.

A protruding column 22A in a substantially triangular column shape is integrally formed at an outer periphery face at the rear-right side of the mounting tube 22. The protruding column 22A extends in the vertical direction (in the axial direction of the mounting tube 22). A right face of the protruding column 22A is disposed to be perpendicular to the left-and-right direction, and a rear face of the protruding column 22A is disposed to be perpendicular to the front-and-rear direction.

A right slot 24 with a rectangular shape in cross section is formed in a right end portion of a lower portion of the mounting tube 22. The right slot 24 serves as a third engaging portion. The right slot 24 extends in the front-and-rear direction and penetrates through the protruding column 22A, and opens out to the front side, rear side and right side. The right slot 24 also opens to the interior of the mounting tube 22. A left-and-right direction position of a left face (floor face) of the right slot 24 matches a left-and-right direction position of the right end of the shaft 14.

An angled face 22B with a flat surface shape is formed at an outer periphery face at the rear-left side of the mounting tube 22. The angled face 22B extends in the vertical direction and is angled in a direction toward the front toward the left.

A restricting column 26 in a substantially triangular column shape is integrally formed at a lower portion of the outer periphery face at the rear-left side of the mounting tube 22. The restricting column 26 serves as a restricting portion. A rear portion of the restricting column 26 is integrated with the angled face 22B. A left face of the restricting column 26 is angled toward the left toward the rear, and a rear face of the restricting column 26 is disposed to be perpendicular to the front-and-rear direction.

A left slot 28 with a rectangular shape in cross section is formed in a left end portion of the lower portion of the mounting tube 22. The left slot 28 serves as a second engaging portion. A vertical direction position of the left slot 28 matches a vertical direction position of the right slot 24. The left slot 28 extends in the front-and-rear direction and penetrates through the angled face 22B and the restricting column 26. The left slot 28 opens out to the front side, rear side and left side. The restricting column 26 is divided into a pair of restricting plates 26A by the left slot 28. The restricting plates 26A serve as restricting parts. The pair of restricting plates 26A are each formed in a substantially triangular plate shape and oppose one another in the vertical direction. The left slot 28 also opens to the interior of the mounting tube 22 and is in fluid communication with the insertion slot 16 of the shaft 14. An upper face, lower face and right face (floor face) of the left slot 28 are disposed at positions matching, respectively, an upper face, lower face and right face (floor face) of the insertion slot 16.

An anchoring post 30 in a rectangular column shape is integrally formed at a front end portion of the lower portion of the mounting tube 22. The anchoring post 30 is disposed at the upper side relative to the right slot 24 and the left slot 28. An anchoring protrusion 30A in a substantially rectangular column shape is integrally formed at a front end portion of the anchoring post 30. The anchoring protrusion 30A serves as an anchoring portion. The anchoring protrusion 30A protrudes to the lower side and a vertical direction position thereof matches the vertical direction positions of the right slot 24 and left slot 28.

A clip 32 with a substantially "U"-shaped rod shape in plan view is mounted to the lower portion of the mounting tube 22. The clip 32 serves as an engaging member and is fabricated of metal. The clip 32 is formed in a circular shape in cross section. The interior of the clip 32 opens out to the rear side, and the clip 32 features resilience.

A front end portion of the clip 32 is formed as a base portion 32A. The base portion 32A is inflected in a shape protruding to the front side. The base portion 32A is disposed between the front end of the mounting tube 22 and the anchoring protrusion 30A. Movement of the base portion 32A to the rear side is anchored by the front end of the mounting tube 22, and moment of the base portion 32A to the front side is anchored by the anchoring protrusion 30A.

A right portion of the clip 32 is formed as a right arm portion 32B. The right arm portion 32B projects to the rear side from the right end of the base portion 32A, and a rear portion of the right arm portion 32B is inflected in a direction toward the right toward the rear. The right arm portion 32B is inserted into the right slot 24 of the mounting tube 22. Due to resilient force of the clip 32 (resilient restoring force), the right arm portion 32B abuts against the left face of the right slot 24 and the right end of the shaft 14. A rear end portion of the right arm portion 32B projects a little to the rear side from the right slot 24.

A left portion of the clip 32 is formed as a left arm portion 32C, which serves as a pushed portion. The left arm portion 32C projects to the rear side from the left end of the base portion 32A, and a rear portion of the left arm portion 32C is inflected in a direction toward the left toward the rear. The left arm portion 32C is inserted into the left slot 28 of the mounting tube 22 and the insertion slot 16 of the shaft 14. Due to resilient force of the clip 32, the left arm portion 32C abuts against the right face of the insertion slot 16. The left arm portion 32C is fitted tightly in the vertical direction into the left slot 28 and the insertion slot 16, and is engaged therewith. Relative movement of the left arm portion 32C in the vertical direction relative to the insertion slot 16 and the left slot 28 is restricted. Thus, movement of the knob 18 (and the mounting tube 22) in the vertical direction relative to the shaft 14 is restricted, detachment of the knob 18 from the shaft 14 is restricted, and the state of mounting of the knob 18 to the shaft 14 is maintained. A rear end portion of the left arm portion 32C projects to the rear side from a right end portion of the left slot 28 (between the pair of restricting plates 26A).

A cover in a substantially tubular shape (not shown in the drawings) that serves as a cover body is detachably mounted to an upper portion of the mounting tube 22. The shaft 14 penetrates through a lower end portion of the cover, and the cover covers a lower side of the knob main body 20 and an outer periphery of the mounting tube 22 (including the clip 32).

Now, operation of the present exemplary embodiment is described.

In the shift device 10 with the structure described above, when the knob 18 is to be detached from the shaft 14 of the lever 12, the cover is first detached from the mounting tube 22 of the knob 18, and the cover is moved to the lower side along the shaft 14. As a result, the outer periphery of the mounting tube 22 of the knob 18 (including the clip 32) is exposed.

Figure 3B:
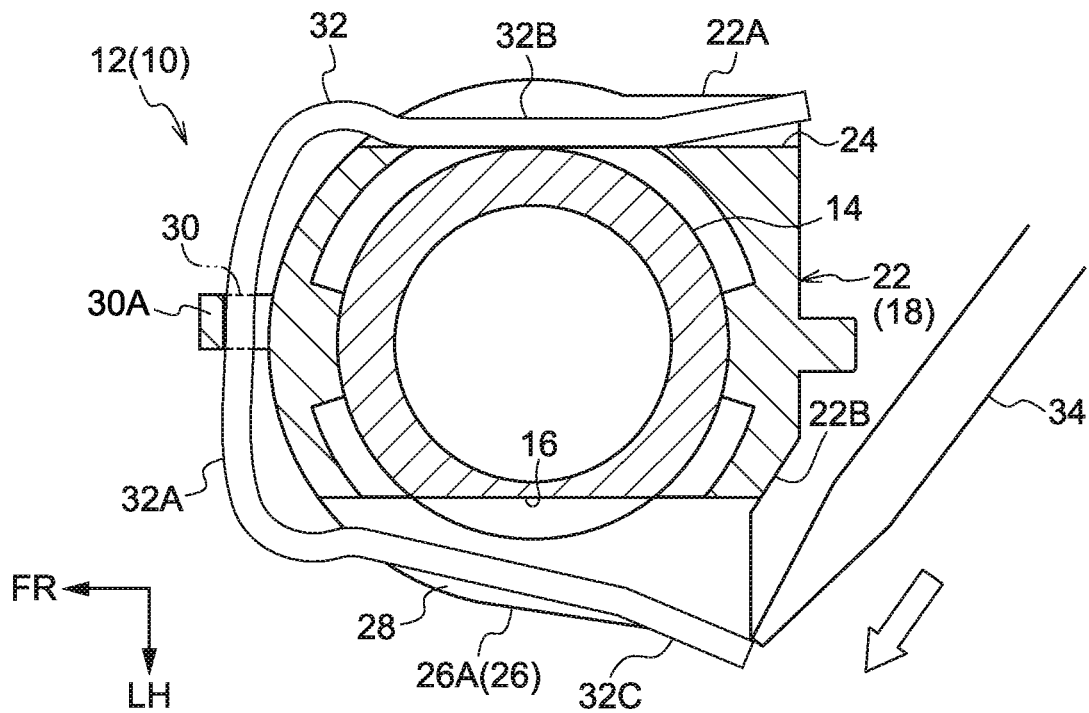

Thereafter, as shown in FIG. 3B, a tool 34 that serves as a pushing object (for example, a screwdriver) is moved to the left side, from the angled face 22B of the mounting tube 22 toward the rear face of the restricting column 26 (the pair of restricting plates 26A), and the rear end portion of the left arm portion 32C of the clip 32 is pushed to the left side by the tool 34. As a result, the left arm portion 32C is rotationally moved to the left side about the front side of the left arm portion 32C in opposition to the resilient force of the clip 32, and the left arm portion 32C is removed from the insertion slot 16 of the shaft 14. In consequence, the left slot 28 of the mounting tube 22 is movable to the upper side relative to the insertion slot 16, and the knob 18 (the mounting tube 22) is movable to the upper side relative to the shaft 14. Hence, the knob 18 can be removed from the shaft 14 by the knob 18 being moved to the upper side relative to the shaft 14.

When the left arm portion 32C of the clip 32 is pushed to the left side by the tool 34 and the left arm portion 32C is rotationally moved to the left side about the front side thereof as described above, a left side portion of the base portion 32A of the clip 32 is deformed toward the front side. Due to the left side portion of the base portion 32A deforming toward the front side and the left arm portion 32C rotationally moving toward the left side, a rear end face of the left arm portion 32C moves toward the front side. Therefore, after the engagement of the left arm portion 32C with the insertion slot 16 (the tight fitting in the vertical direction) is released, when the tool 34 reaches the left end of the rear face of the restricting column 26 (the pair of restricting plates 26A) of the mounting tube 22, the rear end face of the left arm portion 32C moves from the rear side of the restricting column 26 into the restricting column 26 (between the pair of restricting plates 26A). As a result, the left arm portion 32C disengages from the tool 34 (the left arm portion 32C is separated from the tool 34) and further pushing of the left arm portion 32C to the left side by the tool 34 is not possible (is restricted).

Therefore, excessive deformation of the clip 32 may be inhibited, plastic deformation of the clip 32 may be inhibited, and detachment of the clip 32 from the mounting tube 22 (from one or more of the left slot 28, the right slot 24 and the anchoring protrusion 30A) may be inhibited.

Excessive deformation of the clip 32 may be inhibited simply by providing the restricting column 26 (the pair of restricting plates 26A) at the mounting tube 22. Thus, excessive deformation of the clip 32 may be inhibited with a simple structure. In addition, constraints on the provision of the restricting column 26 from the design of the lever 12 and peripheral components (for example, the mounting tube 22, the cover and the shaft 14) may be suppressed.

Second Exemplary Embodiment

Figure 4A:
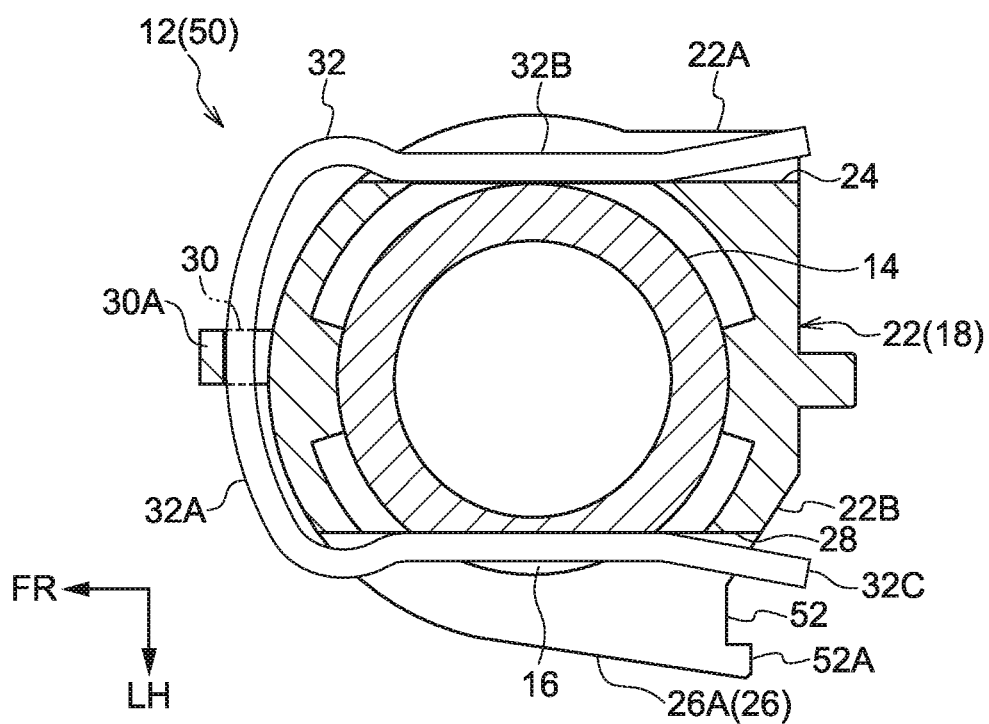

FIG. 4A shows principal portions of a shift device 50 according to a second exemplary embodiment of the present disclosure in a sectional view seen from upward (a sectional view cut along line 3A-3A in FIG. 1).

The shift device 50 according to the present exemplary embodiment has substantially the same structure as in the first exemplary embodiment described above but differs in the following respects.

As shown in FIG. 4A, in the lever 12 of the shift device 50 according to the present exemplary embodiment, a recess portion 52 with a trapezoid shape in cross section is formed in the mounting tube 22 of the knob 18, at a rear end portion of the restricting column 26 (the pair of restricting plates 26A). The recess portion 52 opens out to the upper side, lower side and rear side. A right face of the recess portion 52 is coplanar with the angled face 22B of the mounting tube 22. A front face (floor face) of the recess portion 52 is disposed to be perpendicular to the front-and-rear direction, and a left face of the recess portion 52 is disposed to be perpendicular to the left-and-right direction.

A protrusion portion 52A with a rectangular shape in cross section is formed at the left side of the recess portion 52, at a rear end portion of the restricting column 26 (the pair of restricting plates 26A). The protrusion portion 52A serves as the restricting portion. A right face of the protrusion portion 52A serves as the left face of the recess portion 52.

When the knob 18 is to be detached from the shaft 14 of the lever 12, the cover is first detached from the mounting tube 22 of the knob 18, and the cover is moved to the lower side along the shaft 14. As a result, the outer periphery of the mounting tube 22 of the knob 18 (including the clip 32) is exposed.

Figure 4B:
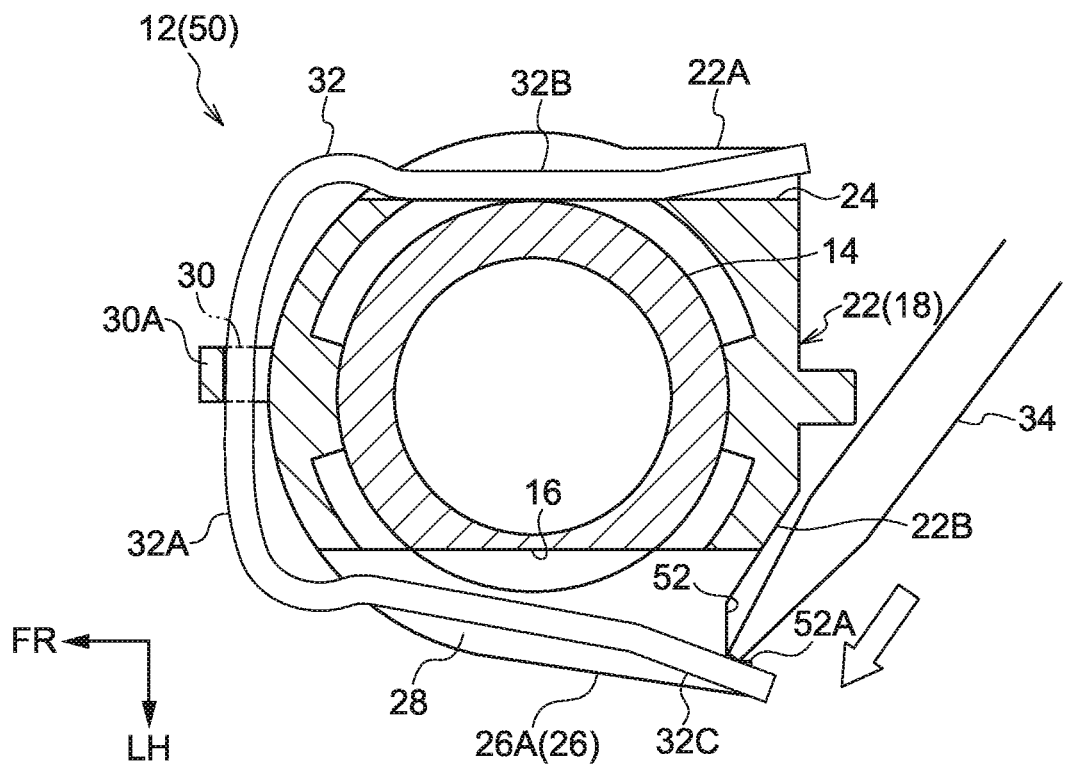

Thereafter, as shown in FIG. 4B, the tool 34 is moved to the left side from the angled face 22B of the mounting tube 22 toward the right face and front face of the recess portion 52 of the restricting column 26 (the pair of restricting plates 26A), and the rear end portion of the left arm portion 32C of the clip 32 is pushed to the left side by the tool 34. As a result, the left arm portion 32C is rotationally moved to the left side about the front side of the left arm portion 32C in opposition to the resilient force of the clip 32, and the left arm portion 32C is removed from the insertion slot 16 of the shaft 14. In consequence, the left slot 28 of the mounting tube 22 is movable to the upper side relative to the insertion slot 16, and the knob 18 (the mounting tube 22) is movable to the upper side relative to the shaft 14. Hence, the knob 18 can be removed from the shaft 14 by the knob 18 being moved to the upper side relative to the shaft 14.

After the left arm portion 32C of the clip 32 has been pushed to the left side by the tool 34 and the engagement of the left arm portion 32C with the insertion slot 16 (the tight fitting in the vertical direction) has been released, when the tool 34 abuts against the right face of the protrusion portion 52A of the restricting column 26 (the pair of restricting plates 26A), further movement of the tool 34 to the left side is restricted by the protrusion portion 52A. Thus, further pushing of the left arm portion 32C to the left side by the tool 34 is restricted.

Therefore, in the present exemplary embodiment, the same operations and effects as in the first exemplary embodiment described above are realized.

Moreover, when the tool 34 is abutting against the protrusion portion 52A of the restricting column 26 as described above, the state in which the engagement of the left arm portion 32C with the insertion slot 16 is released can be maintained simply by maintaining pressure on the protrusion portion 52A and the left arm portion 32C from the tool 34. Therefore, the state in which the engagement of the left arm portion 32C with the insertion slot 16 is released may be maintained with ease, and the knob 18 may be detached from the shaft 14 easily.

In the first exemplary embodiment and second exemplary embodiment described above, the shaft 14 is inserted into the mounting tube 22 of the knob 18. However, the mounting tube 22 of the knob 18 may be inserted into the shaft 14.

In the first exemplary embodiment and second exemplary embodiment described above, the clip 32 is pushed to release the engagement of the clip 32 with the insertion slot 16 of the shaft 14. However, the clip 32 may be pushed to release the engagement of the clip 32 with the left slot 28 of the knob 18.

In the first exemplary embodiment and second exemplary embodiment described above, the lever 12 is turned. However, the lever 12 may be slid.

What is claimed is:

1. A shift device having a shift body, the shift body comprising:
   a shift main body, the shift body being moved and a shift position thereof being changed, and a first engaging portion being provided at the shift main body;
   an operation body, the operation body being operated and moving the shift body, and a second engaging portion being provided at the operation body;
   an engaging member with resilience, the engaging member engaging with the first engaging portion and the second engaging portion and restricting detachment of the operation body from the shift main body, and, when the engaging member is pushed, the engaging member deforming and releasing the engagement with at least one of the first engaging portion or second engaging portion; and
   a restricting portion that, after the engagement of the engaging member with the at least one of the first engaging portion or second engaging portion has been released, restricts pushing of the engaging member,
   wherein the second engaging portion is a slot; and
   the restricting portion is provided at the operation body, and is integrally formed at a periphery of the slot so as to protrude from the periphery of the slot.

2. The shift device according to claim 1, wherein the restricting portion separates a pushing object from the engaging member after the pushing object has deformed the engaging member out of the slot.

3. The shift device according to claim 2 wherein, when the engaging member is pushed, the engaging member moves into the restricting portion.

4. The shift device according to claim 1, wherein the restricting portion restricts movement of a pushing object that pushes the engaging member.

* * * * *